United States Patent
Gruenhagen et al.

(10) Patent No.: US 12,442,776 B1
(45) Date of Patent: Oct. 14, 2025

(54) PIPE INSPECTION VIDEO PROCESSING SYSTEM

(71) Applicant: ClearObject Corporation, Fishers, IN (US)

(72) Inventors: Tim Gruenhagen, Indianapolis, IN (US); Chase Weaver, Fishers, IN (US); Derek Bleyle, Cicero, IN (US); Justin Starr, Baden, PA (US)

(73) Assignee: ClearObject Corporation, Fishers, IN (US)

( * ) Notice: Subject to any disclaimer, the term of this patent is extended or adjusted under 35 U.S.C. 154(b) by 171 days.

(21) Appl. No.: 18/226,824

(22) Filed: Jul. 27, 2023

Related U.S. Application Data (60) Provisional application No. 63/393,397, filed on Jul. 29, 2022.

(51) Int. Cl.
*G01N 21/954* (2006.01)
*G01N 21/88* (2006.01)

(52) U.S. Cl.
CPC ....... *G01N 21/954* (2013.01); *G01N 21/8851* (2013.01); *G01N 2021/8861* (2013.01); *G01N 2021/8874* (2013.01); *G01N 2021/8883* (2013.01); *G01N 2021/8887* (2013.01); *G01N 2021/9546* (2013.01)

(58) Field of Classification Search
CPC ............. G01N 21/954; G01N 21/8851; G01N 2021/8861; G01N 2021/8874; G01N 2021/8883; G01N 2021/8887; G01N 2021/9546; G06V 10/82; G06V 10/761; G06V 20/47; G06V 20/49; G06V 20/60; G01V 10/764
See application file for complete search history.

(56) References Cited

U.S. PATENT DOCUMENTS

| | | | | |
|---|---|---|---|---|
| 2014/0063229 A1* | 3/2014 | Olsson | ................. | G01N 21/954 348/84 |
| 2014/0313316 A1* | 10/2014 | Olsson | ................. | H04N 23/741 348/84 |
| 2014/0320631 A1* | 10/2014 | Olsson | ................. | G01N 21/954 348/84 |
| 2014/0366634 A1* | 12/2014 | Sohn | .................... | G01N 29/041 73/643 |

(Continued)

OTHER PUBLICATIONS

Aguilar et al "Technology Configured To Enable Fault Detection and Condition Assessment of Underground Stormwater and Sewer Pipes", Sep. 16, 2021, WO 2021179033 A1 (Year: 2021).*

*Primary Examiner* — Sang H Nguyen
(74) *Attorney, Agent, or Firm* — Bauer and Joseph; Thomas Michael Joseph (57) ABSTRACT

A cloud server has memory for storing computer readable instructions and a processor for executing the computer readable instruction. A pipe inspection video is received for storage in a video storage container. A plurality of frames is extracted from the pipe inspection video. A plurality of receiver containers is formed to perform artificial intelligence operations the plurality of frames in parallel. The plurality of frames is sent to the plurality of receiver containers to obtain metrics relating to the pipe inspection video. The plurality of frames is returned to the video storage container. The plurality of frames is compiled into a processed pipe inspection video.

18 Claims, 7 Drawing Sheets

(56) References Cited

U.S. PATENT DOCUMENTS

| | | | | |
|---|---|---|---|---|
| 2015/0112647 | A1* | 4/2015 | Currin | H04L 67/10 |
| | | | | 703/1 |
| 2017/0023492 | A1* | 1/2017 | Olsson | H04N 23/58 |
| 2017/0323163 | A1* | 11/2017 | Leung | G06F 18/24133 |
| 2019/0139215 | A1* | 5/2019 | Starr | G06V 10/82 |
| 2021/0082098 | A1* | 3/2021 | Kumbhare | G06T 7/0004 |
| 2023/0101112 | A1* | 3/2023 | Aguilar | G06V 10/82 |
| | | | | 382/156 |

* cited by examiner

PIPE INSPECTION VIDEO PROCESSING SYSTEM

CROSS REFERENCE TO RELATED APPLICATION

This application claims the benefit under 35 U.S.C. § 119(e) of U.S. Provisional Application No. 63/393,397 entitled "PIPE INSPECTION VIDEO PROCESSING SYSTEM" filed Jul. 29, 2022, which is incorporated herein by reference.

BACKGROUND

Sewer pipes, storm drains, culverts, and other pipe structures are part of the United States aging infrastructure, which includes over two million miles of pipe for keeping waters clean and for removing sewage and other waste waters. Some of these pipe structures have been in service since the 1800s. As a result, a rigorous inspection regime is necessary to keep the pipe-base infrastructure working.

Engineering firms spend a lot of time reviewing and ensuring that a lateral pipe inspection is of the highest quality so that cities can make the right decisions on how and when to take action. These firms, typically, use conventional human-based inspection video systems. Unfortunately, these systems do not provide a seamless experience for engineers and inspectors.

Further, such systems are not always efficient, consistent, and accurate inspection reports. Accordingly, there is a need for an improved pipe inspection system to provide actionable insights for municipalities.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a video processing for processing an inspection video for a pipe is provided. A cloud server has memory for storing computer readable instructions and a processor for executing the computer readable instruction. A pipe inspection video is received for storage in a video storage container. A plurality of frames is extracted from the pipe inspection video. A plurality of receiver containers is formed to perform artificial intelligence operations the plurality of frames in parallel. The plurality of frames is sent to the plurality of receiver containers to obtain metrics relating to the pipe inspection video. The plurality of frames is returned to the video storage container. The plurality of frames is compiled into a processed pipe inspection video.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The subject disclosure is directed to a pipe inspection video processing system and, more specifically, to systems, methods, and apparatus for processing pipe inspection videos to provide intelligent and actionable insights from pipe inspection videos. It should be understood that the term "pipe" is being used in its most expansive sense to include sewer pipes, storm drains, culverts, and other pipe structures that are used to transport clean water, waste water, storm water, and/or sewage.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
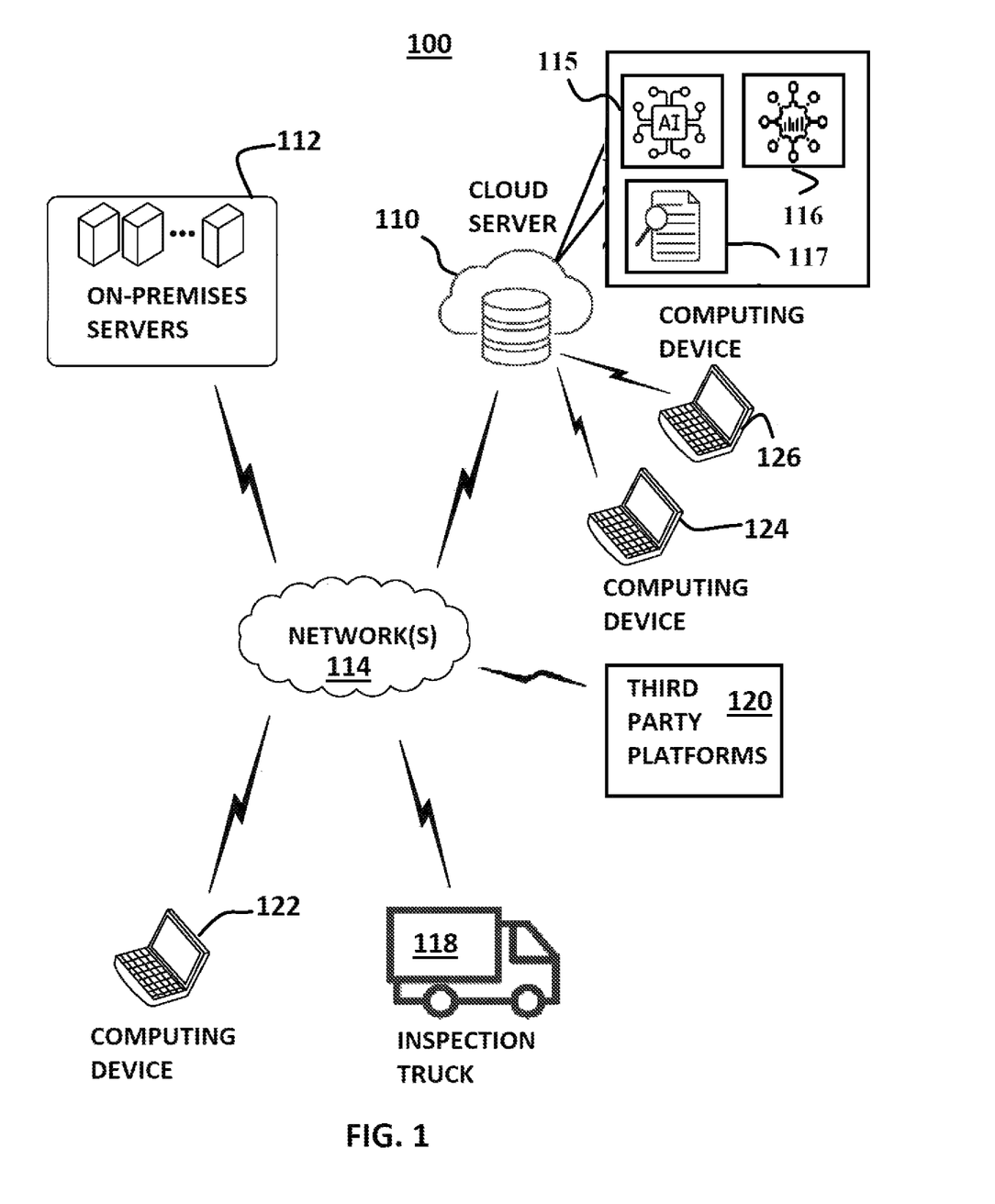
FIG. 1 is a schematic diagram for a system for processing pipe inspection videos in accordance with this disclosure.

Referring to FIG. 1, a pipe inspection video processing system, generally designated by the numeral 100, is shown. The system 100 includes a cloud server 110 and one or more on-premises servers 112 that connect to one another over a network 114. Various components, such as an artificial intelligence component 115 for performing operations on pipe inspection videos, a decision support platform 116, and an audit log 117, reside on the cloud server 110.

The pipe inspection videos can be obtained during the inspection of pipes with crawlers (not shown) that are transported or stored on inspection trucks 118. The videos can be uploaded from the inspection trucks 118 to the cloud server 110 and/or the on-premises servers 112 over the network 114. Alternatively, the pipe inspection videos can be uploaded through third party platforms 120 and/or computing devices 122 operated by pipe inspectors or other users.

The pipe inspection videos can be processed on the cloud server 110 and provided to pipe inspectors or other users for review on computing devices 124-126. The videos can be viewed, analyzed, and edited using the computing devices 124-126.

The operators of the computing devices 124-126 have the ability to edit pipe inspection videos simultaneously because the inspection videos can be dynamically synched in real-time on the cloud server 110. In some embodiments, the pop-up boxes can be triggered within in the video frames to indicate that another operator is editing a particular frame or set of frames at given time.

The decision support platform 116 can perform operations, such as automated sorting and aggregation of root scores, blockages, and other phenomena to create a prioritization list or work plan. The audit log 117 can show the full edit history of each inspector comment, artificial intelligence code or engineer modification showing the entire history of a pipe.

Network 114 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network. Computer systems and/or computing devices can communicate via network 114 using various communication protocols (e.g., Internet communication protocols, WAN communication protocols, LAN communications protocols, P2P protocols, telephony protocols, and/or other network communication protocols), various authentication protocols, and/or various data types (web-based data types, audio data types, video data types, image data types, messaging data types, signaling data types, and/or other data types).

In some embodiments, inspection videos can be made available on the cloud server 110 to third parties who do not have access to system 100 through a sharelink. In such embodiments, processed inspection videos can be made accessible on a read-only basis.

Figure 2:
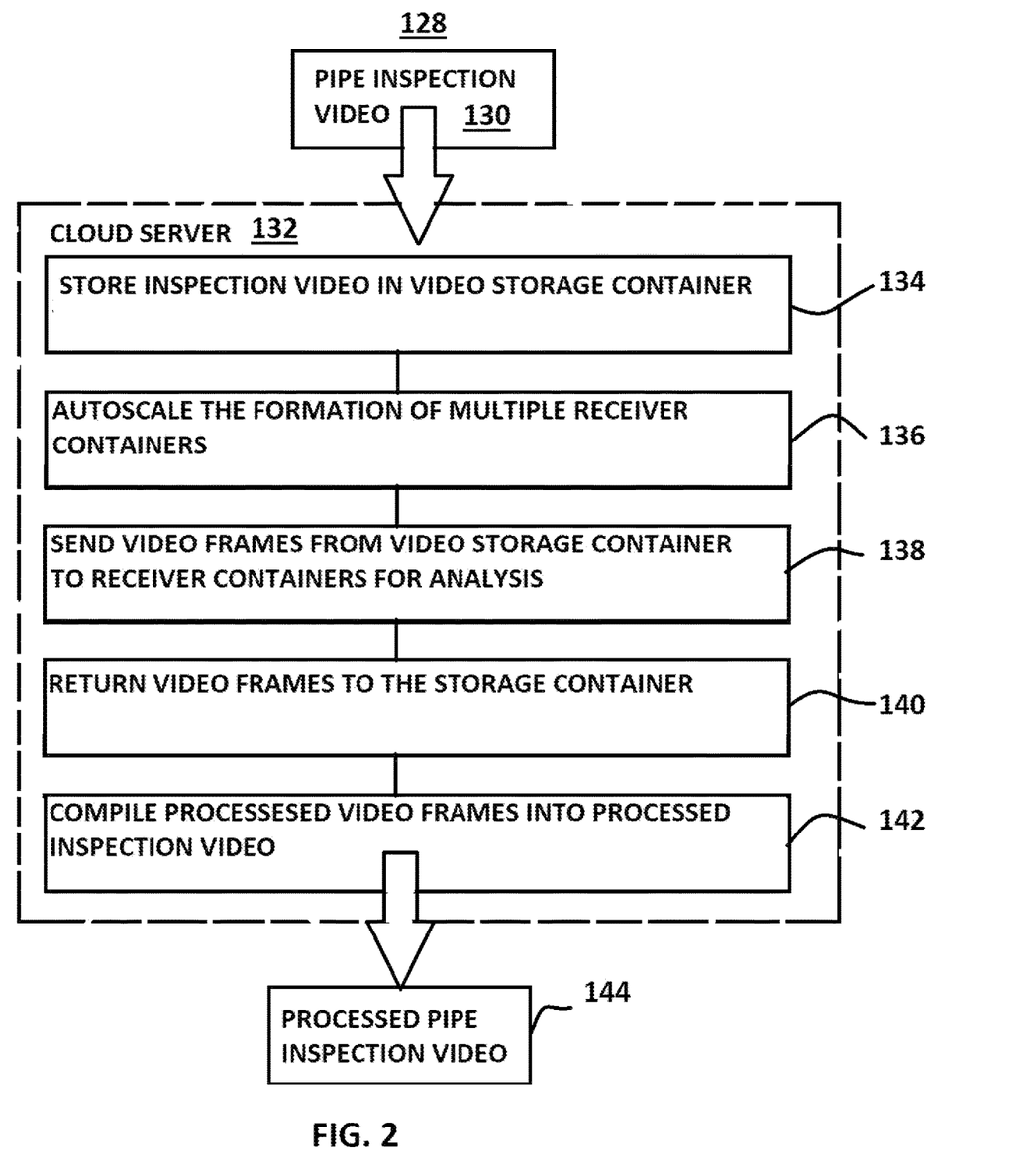
FIG. 2 is a box diagram illustrating the processing of a pipe inspection video in accordance with this disclosure.

Referring now to FIG. 2 with continuing reference to the foregoing figure, the process flow, generally designated with the numeral 128, for processing pipe inspection videos 130 is shown. The process flow 128 begins with the uploading of one of the pipe inspection videos 130 to a cloud server 132. The cloud server 132 can be the cloud server 110 shown in FIG. 1.

At 134, the pipe inspection video 130 is stored in a video storage container. In this exemplary embodiment, the video storage container is provisioned within a cloud environment that resides on the cloud server 132.

At 136, multiple receiver containers are formed. The receiver containers are formed through autoscaling to increase the desired count of tasks within the cloud environment. The autoscaling in Step 136 provides the ability to process frames within the pipe inspection video 130 in parallel. The receiver containers represent artificial intelligence endpoints.

At 138, video frames from the pipe inspection video 130 are sent from the video storage container to the receiver containers for analysis. In the exemplary embodiment, the analysis is performed by an artificial intelligence component, such as the artificial intelligence component 115 shown in FIG. 1. The artificial intelligence component 115 can perform various operations on the pipe inspection video 130.

At 140, the video frames are returned to the storage container. At 142, the video frames are compiled in to a processed pipe inspection video 144. The processed pipe inspection video 144 can reside within the cloud environment on the cloud server 132 for access thereon. The processed pipe inspection video 144 can be accessed by pipe inspectors or users using the computing devices 124-126 shown in FIG. 1.

Figure 3:
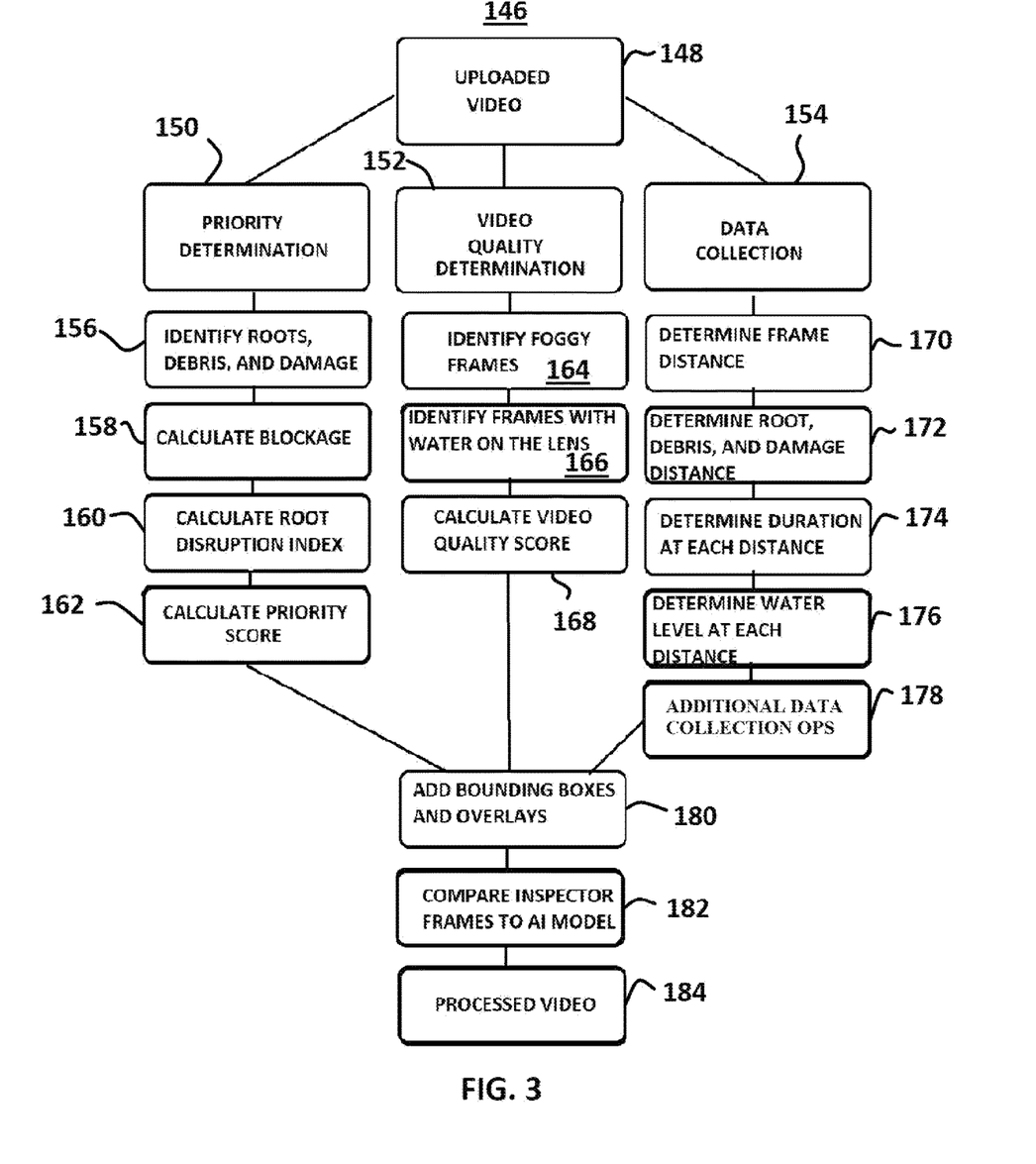
FIG. 3 is a process diagram illustrating artificial intelligence operations on the pipe inspection video shown in FIG. 2 in accordance with this disclosure.

Referring now to FIG. 3 with continuing reference to the foregoing figures, various artificial intelligence operations, generally designated by the numeral 146, are shown. The operations 146 can be performed using the artificial intelligence component 115 shown in FIG. 1 to process an uploaded pipe inspection video 148. The operations 146 can include priority determination operations 150, video quality determination operations 152, and data collection operations 154 to obtain metrics relating to the uploaded pipe inspection video 148.

The priority determination operations 150 can proceed through a series of steps 156-162. At Step 156, roots, debris, and pipe damage can be identified within the frames of the uploaded video 148. Step 156 can also involve identifying disruptions caused by the roots, debris, and pipe damage.

At Step 158, the blockage within a pipe can be quantified by determining a percentage of blockage. Then, at Step 160, a root disruption index can be calculated using the number of roots and the percentage of blockage. In other embodiments, indices based upon debris, pipe damage, or other factors can be determined. Additionally, the size of roots, debris, or pipe damage can be considered in the determination of indices, as well.

At Step 162, a priority score can be assigned to the uploaded pipe inspection video 148 based upon the metrics that are obtained through the priority determination operations 150. The priority score can be used to determine the priority of review by a user.

The video quality determination operations 152 can proceed through a series of steps 164-168. At Step 164, foggy frames for the uploaded pipe inspection video 148 are identified. At Step 166, frames that include water on the lens for the uploaded pipe inspection video 148 are identified. Then, at Step 168, a video quality score is calculated based upon the results obtained in Steps 164-166 and, in some embodiments, other factors.

The data collection operations 154 can proceed through a series of steps 170-178 to collect data relating to the uploaded pipe inspection video 148.

At Step 170, the distance within the pipe for each frame is determined. It should be understood that the frames for the uploaded pipe inspection video 148 are not necessary obtained linearly, as pipe crawlers can proceed in both forward and reverse directions while obtaining the uploaded pipe inspection video 148.

At Step 172, the distance for each identified root, debris, and/or pipe damage is determined and recorded. At Step 174, the duration of time that the pipe crawler spent at each distance within the pipe is determined. The fact that particular inspector or crawler spent a significant duration of the inspection at a particular distance can be an indicator of a problem at that distance with a pipe Then, at Step 176, the water level is calculated for each frame using an artificial intelligence model that uses trigonometry, namely the law of cosines, to segment out the water level in a frame. The water level can be an indicator of anomalies in the pipe.

At Step 178, various other data collection operations can be performed. For example, optical character recognition can be performed on the uploaded pipe inspection video 148 to identify any pipe inspector notes or other verbal information thereon. Further, the use of optical character recognition can provide insights as to where a particular image within a frame was obtained during the inspection and at which point in time the frame was obtained during the inspection.

Alternatively, Step 178 can include clustering of defects and automatically measuring the length of defects throughout the pipe to identify areas for rehab and/or repair. Further, edge augmentation of real time video feed to point out areas of interest for an operator can be performed in Step 178.

When the priority determination operations 150, the video quality determination operations 152, and the data collection operations 154 are complete, other operations 146 can be performed. These operations 146 can include adding boundary boxes and/or overlays 180 to the uploaded pipe inspection video 148.

The operations 146 can compare the inspector frames to an artificial intelligence model 182 to determine whether conditions, such as roots, debris, or damages were missed. In such operations, the artificial intelligence component can review inspector notes and determine inconsistencies and/or improve the artificial intelligence model produced by the artificial intelligence component.

Once the operations 146 are complete, a data file that includes the results of the operations 146, such the metrics that were obtained, can be added to the uploaded pipe inspection video 148 to form a processed video 184.

Figure 4:
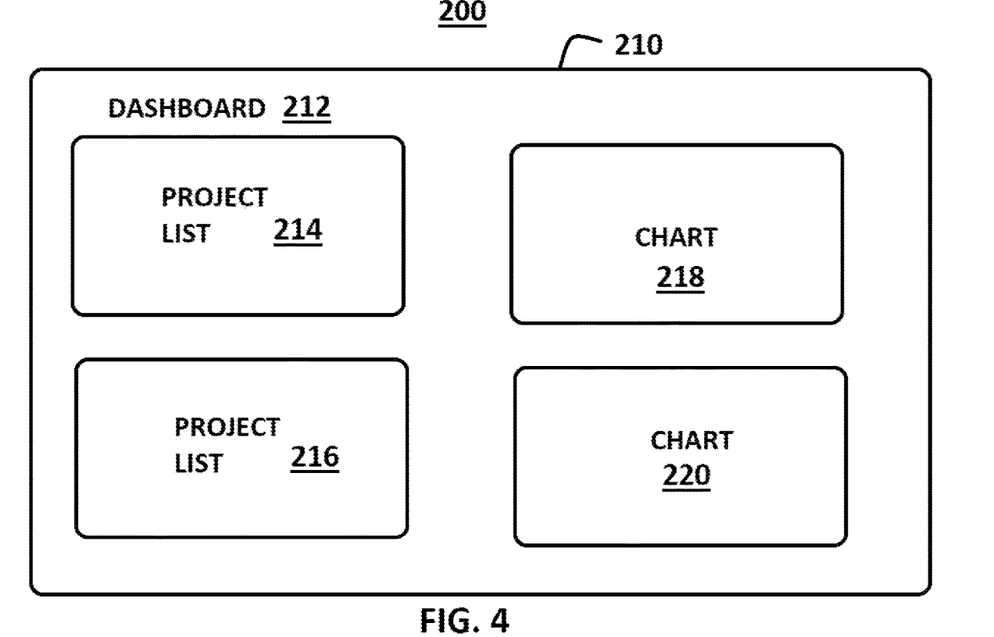
FIG. 4 illustrates an exemplary screen for a dashboard in accordance with this disclosure.

Referring to FIG. 4 with continuing reference to the foregoing figures, an exemplary screen, generally designated by the numeral 200, is shown. The screen 200 displays a browser 210 that is running on a computing device, such as the computing devices 124-126 shown in FIG. 1.

The browser 210 can display a dashboard 212 that includes project lists 214-216 and charts 218-220. Users can filter down through those project lists 214-216 to identify projects within specific cities or municipalities. The charts 218-220 can display metrics that relate to state of a particular inspection, the numbers of roots, disruptions, debris, and/or damage identified during an inspection, and other related data.

Figure 5:
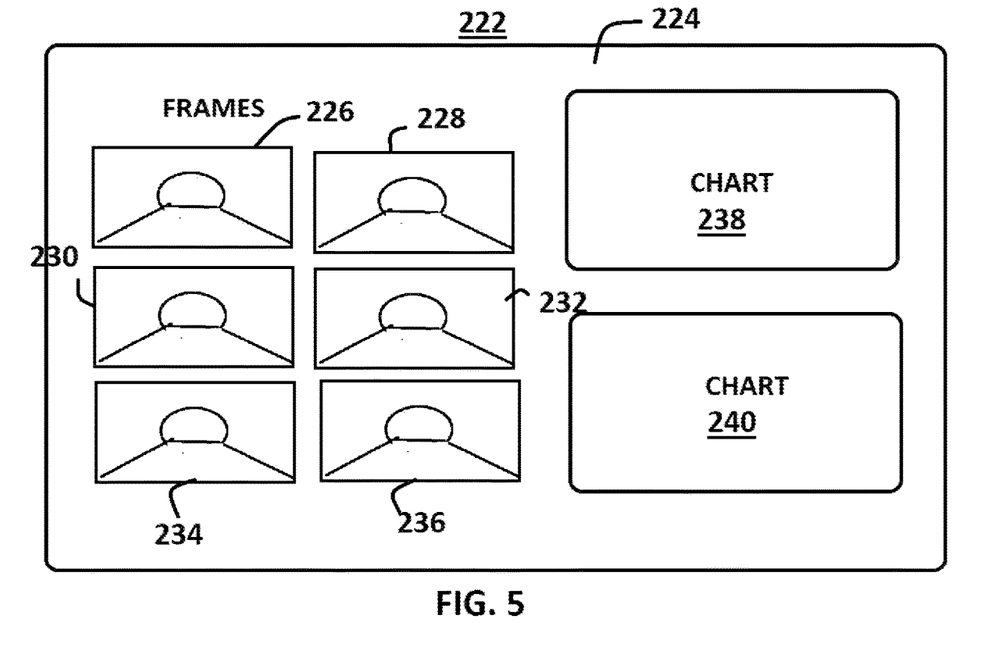
FIG. 5 illustrates an exemplary screen for an interface for the system shown in FIG. 1 in accordance with this disclosure.

Referring to FIG. 5 with continuing reference to the foregoing figures, another exemplary screen, generally designated by the numeral 222, is shown. The screen 222 displays a browser 224 that is running on a computing device, such as the computing devices 124-126 shown in FIG. 1.

The screen 222 can display frames 226-236 from a processed video, such as the processed video 184 shown in FIG. 3. The screen 222 can also display charts 238-240 that are based upon the data that is contained within the processed video 184.

The charts 238-240 can display the location of conditions, such as roots, debris, or damage, within an inspected pipe. The charts 238-240 can display the time in which such conditions were identified within the video. The charts 238-240 can display water levels at each distance within the video and/or a particular time during the inspection. The charts 238-240 can also display the duration that the crawler spent at a particular location within the pipe to provide additional insights.

It should be understood that the client application can be mobile responsive, so that a computing device and screen layout can vary depending upon the size of a computing device, such as either one of the computing devices 124-126 shown in FIG. 1.

Figure 6:
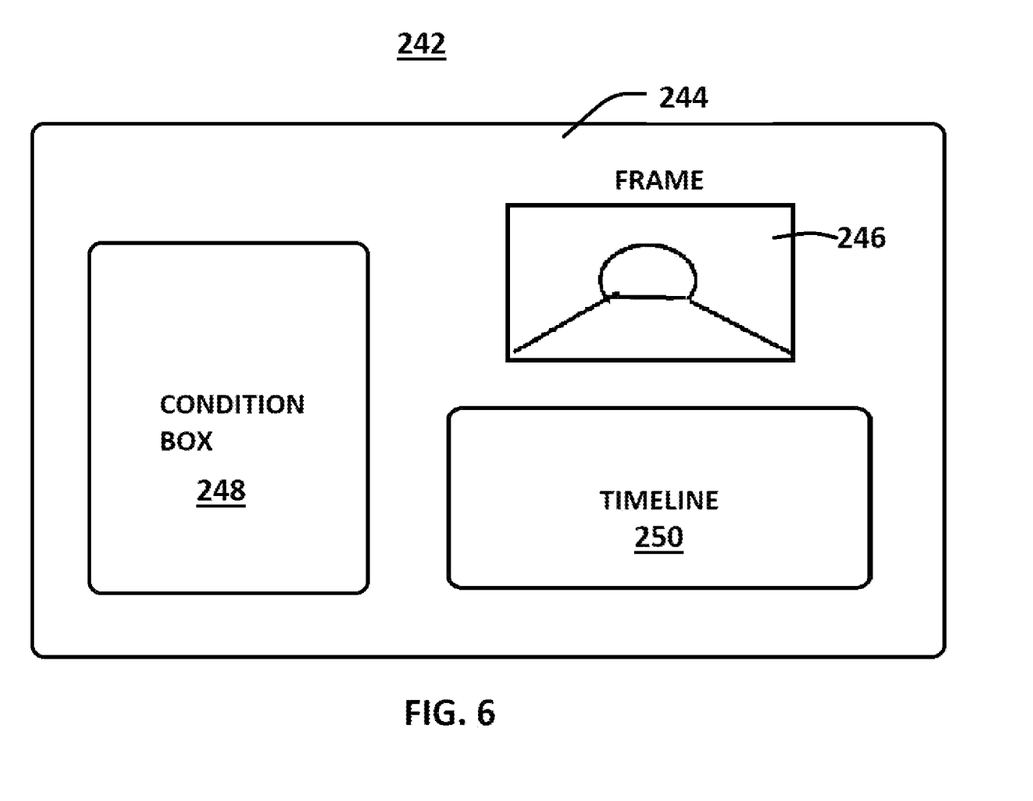
FIG. 6 illustrates an exemplary screen for another interface for the system shown in FIG. 1 in accordance with this disclosure.

Referring to FIG. 6 with continuing reference to the foregoing figures, another exemplary screen, generally designated by the numeral 242, is shown. The screen 242 displays a browser 244 that is running on a computing device, such as the computing devices 124-126 shown in FIG. 1.

The screen 242 can display a frame 246 and a condition box 248 that displays information relating to any condition (i.e., roots, debris, or pipe damage) that appear within the frame 246. The screen 242 can further include a timeline 250 that indicates at which frame (or frames) a particular condition was identified.

The timeline 250 can show where a particular condition is located on a video. Then, a user can select one or more of those conditions on the timeline 250 with the condition box 248 being populated with information about those conditions, such as poor video quality or other metrics.

Further, a user can edit the information to make the data for the inspection video match real-world conditions of the pipe. The editing can be accomplished by accepting or rejecting conditions, which can then indicate that the conditions are ready for review by an engineer.

Figure 7:
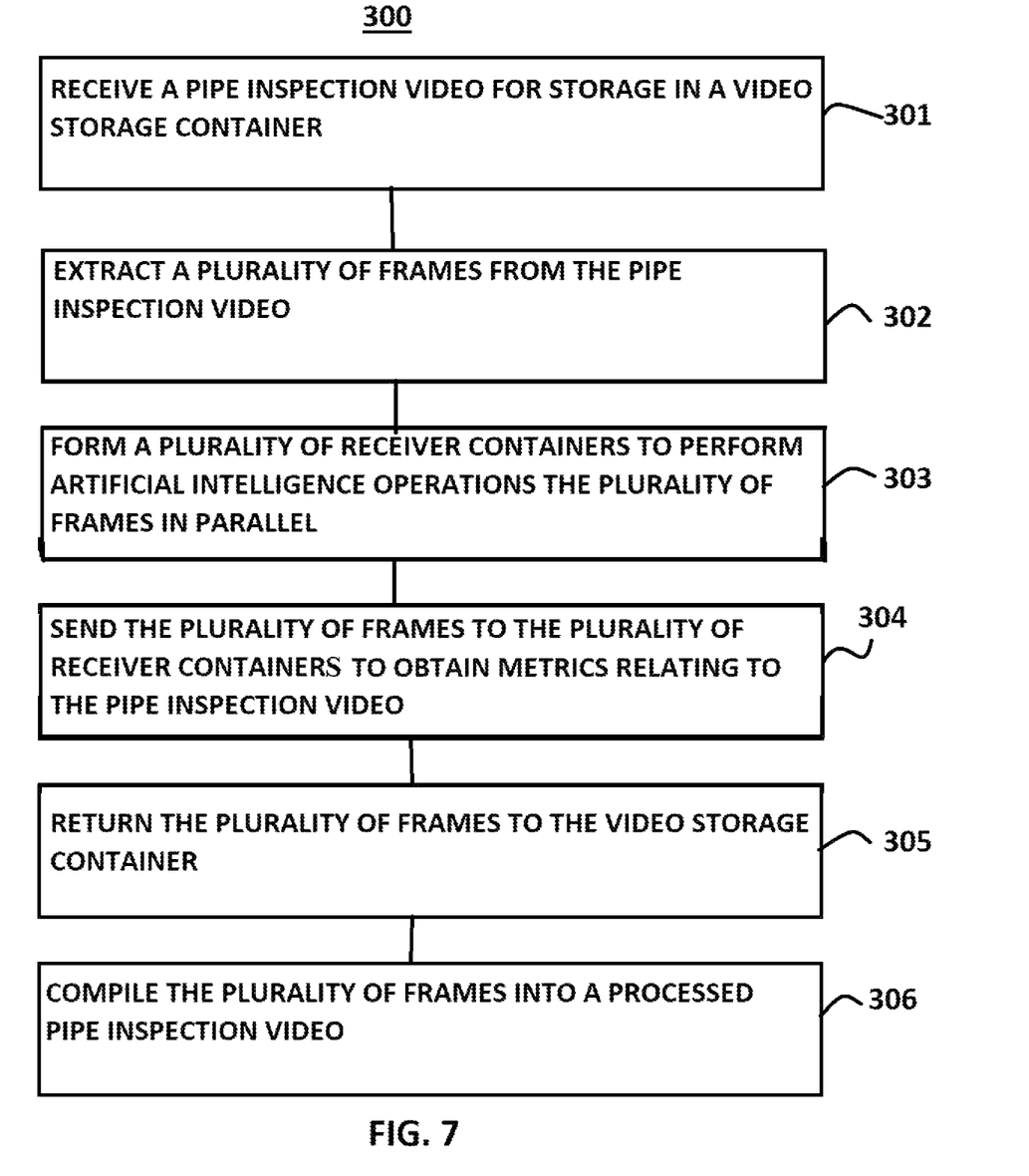
FIG. 7 illustrates an exemplary process in accordance with this disclosure.

Referring to FIG. 7 with continuing reference to the foregoing figures, an exemplary process, generally designated by the numeral 300, for processing pipe inspection videos is shown. The process 300 can be a performed within the system 100 shown in FIG. 1.

At 301, a pipe inspection video is received on a cloud server for storage in a video storage container. In this exemplary embodiment, the cloud server can be the cloud server 110 shown in FIG. 1 and/or the cloud server 132 shown in FIG. 2.

At 302, a plurality of frames are extracted from the pipe inspection video. In this exemplary embodiment, the pipe inspection video can be the pipe inspection video 130 of FIG. 2 and/or the uploaded pipe inspection video 148 of FIG. 3.

At 303, a plurality of receiver containers to are formed to perform artificial intelligence operations the plurality of frames in parallel. In this exemplary embodiment, the artificial intelligence operations can be the artificial intelligence operations 146 shown in FIG. 3.

At 304, the plurality of frames are to the plurality of receiver containers to obtain metrics relating to the pipe inspection video. In this exemplary embodiment, the metrics can obtained through the artificial intelligence operations 146 shown in FIG. 3 and displayed on screen 200 of FIG. 4, screen 222 of FIG. 5, and/or screen 242 of FIG. 6.

At 305, the plurality of frames are returned to the video storage container. In this exemplary embodiment, the video storage container can reside on the cloud server 110 shown in FIG. 1 and/or the cloud server 132 shown in FIG. 2.

At 306, the plurality of frames are compiled into a processed pipe inspection video. In this exemplary embodiment, the processed pipe inspection video can be the processed pipe inspection video 144 of FIG. 2 and/or the processed video 184 of FIG. 3.

Exemplary Cloud Architecture

Figure 8:
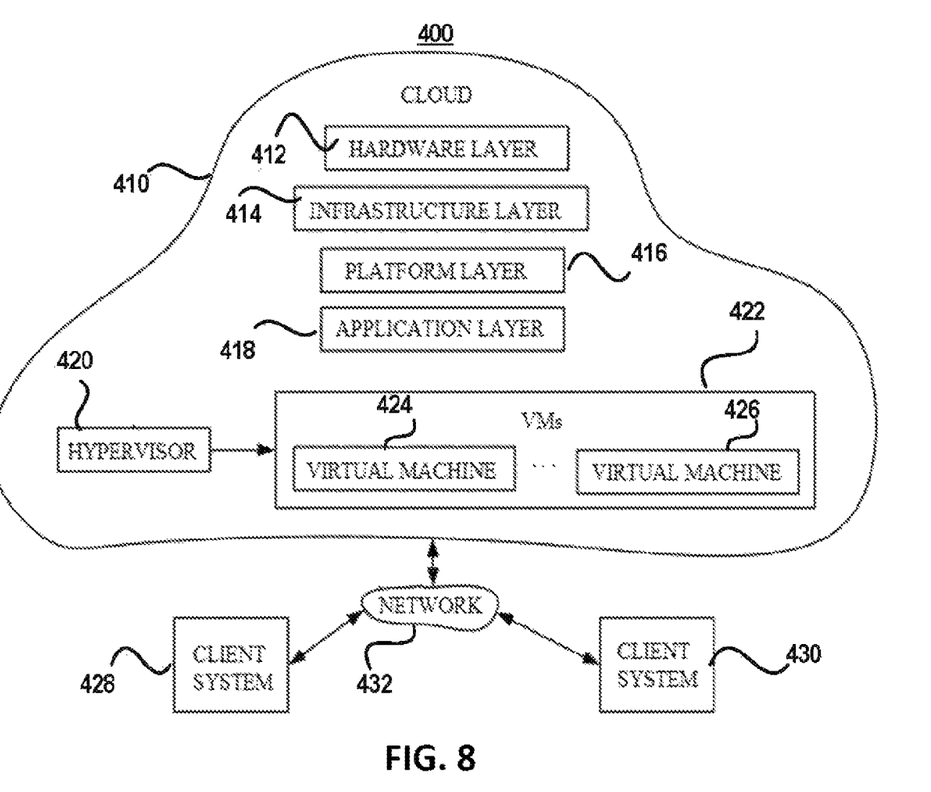
FIG. 8 illustrates a block diagram of a cloud-based computing system operable to execute the disclosed systems and methods in accordance with this disclosure.

Referring to FIG. 8 with continuing reference to the foregoing figures, exemplary cloud architecture, generally designated by the numeral 400, for implementing the system 100 shown in FIG. 1, performing the process 128 shown in FIG. 2, the artificial intelligence operations 146 shown in FIG. 3 and/or the process 300 shown in FIG. 7.

The exemplary cloud architecture 400 provides computation, software, data access, and storage services that do not require end-user knowledge of the physical location or configuration of the system that delivers the services. In various embodiments, cloud computing delivers the services over a wide area network, such as the internet, using appropriate protocols.

For instance, cloud computing providers deliver applications over a wide area network and they can be accessed through a web browser or any other computing component. Software or components of architecture 400 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

As shown in FIG. 8, the cloud architecture 400 includes a cloud 410. The cloud 410 (or each of the different premises on the cloud 410) can include a hardware layer 412, an infrastructure layer 414, a platform layer 416, and an application layer 418.

A hypervisor 420 can illustratively manage or supervise a set of virtual machines 422 that can include a plurality of different, independent, virtual machines 424-426. Each virtual machine can illustratively be an isolated software container that has an operating system and an application inside it. It is illustratively decoupled from its host server by hypervisor 420. In addition, hypervisor 420 can spin up additional virtual machines or close virtual machines, based upon workload or other processing criteria.

A plurality of different client systems 428-430 (which can be end user systems or administrator systems, or both) can illustratively access cloud 410 over a network 432. Depending upon the type of service being used by each of the client systems 428-430, cloud 410 may provide different levels of service. In one example, the users of the client systems are provided access to application software and databases. The cloud service then manages the infrastructure and platforms that run the application. This can be referred to as software as a service (or SaaS). The software providers operate application software in application layer 418 and end users access the software through the different client systems 428-430.

The cloud provider can also use platform layer 416 to provide a platform as a service (PaaS). This involves an operating system, programming language execution environment, database and webserver being provided to the client systems 428-430, as a service, from the cloud provider. Application developers then normally develop and run software applications on that cloud platform and the cloud provider manages the underlying hardware and infrastructure and software layers. In this exemplary embodiment, the cloud provider is Google. The cloud infrastructure 400 is provided by the Google Cloud Platform.

The cloud provider can also use infrastructure layer 414 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy the applications, the cloud users that use IaaS install operating-system images and application software on the cloud infrastructure 400.

Exemplary Computer System

Figure 9:
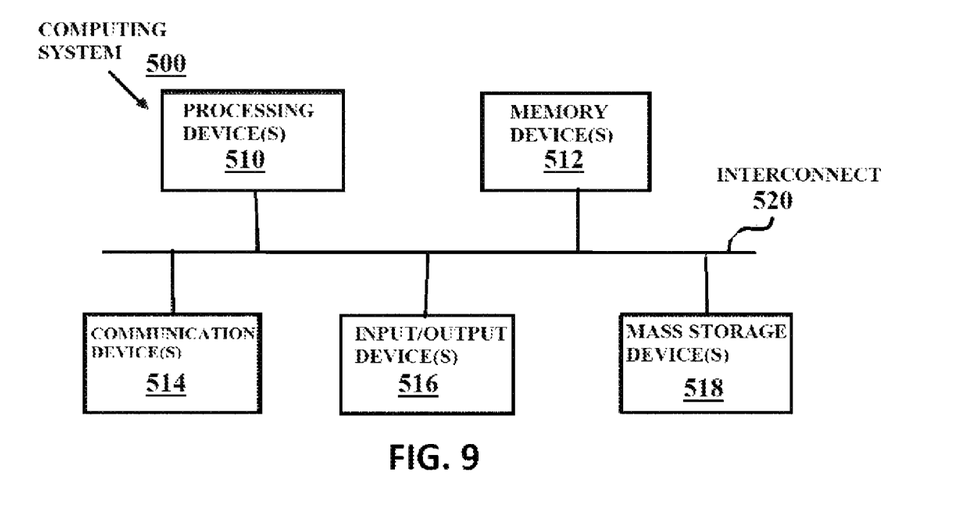
FIG. 9 illustrates a block diagram of a computing system operable to execute the disclosed systems and methods in accordance with this disclosure.

Referring now to FIG. 9 with continuing reference to the forgoing figures, a computer system for implementing an exemplary computing system, generally designated by the numeral 500, for use by the system 100 shown in FIG. 1.

The hardware architecture of the computing system 500 that can be used to implement any one or more of the functional components described herein. In some embodiments, one or multiple instances of the computing system 500 can be used to implement the techniques described herein, where multiple such instances can be coupled to each other via one or more networks.

The illustrated computing system 500 includes one or more processing devices 510, one or more memory devices 512, one or more communication devices 514, one or more input/output (I/O) devices 516, and one or more mass storage devices 518, all coupled to each other through an interconnect 520. The interconnect 520 can be or include one or more conductive traces, buses, point-to-point connections, controllers, adapters, and/or other conventional connection devices. Each of the processing devices 510 controls, at least in part, the overall operation of the processing of the computing system 500 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 512 can be or include one or more physical storage devices, which can be in the form of random access memory (RAM), read-only memory (ROM) (which can be erasable and programmable), flash memory, miniature hard disk drive, or other suitable type of storage device, or a combination of such devices. Each mass storage device 518 can be or include one or more hard drives, digital versatile disks (DVDs), flash memories, or the like. Each memory device 512 and/or mass storage device 518 can store (individually or collectively) data and instructions that configure the processing device(s) 510 to execute operations to implement the techniques described above.

Each communication device 514 can be or include, for example, an Ethernet adapter, cable modem, Wi-Fi adapter, cellular transceiver, baseband processor, Bluetooth or Bluetooth Low Energy (BLE) transceiver, serial communication device, or the like, or a combination thereof. Depending on the specific nature and purpose of the processing devices 510, each I/O device 516 can be or include a device such as a display (which can be a touch screen display), audio speaker, keyboard, mouse or other pointing device, microphone, camera, etc. Note, however, that such I/O devices 516 can be unnecessary if the processing device 510 is embodied solely as a server computer.

In the case of a client device, the communication devices (s) 514 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 514 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 512). A processor (e.g., processing device(s) 510) is "configured to execute a software program" when at least one value associated with the software program is stored in a register that is readable by the processor. In some embodiments, routines executed to implement the disclosed techniques can be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 510), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 512).

SUPPORTED FEATURES AND EMBODIMENTS

The detailed description provided above in connection with the appended drawings explicitly describes and supports various features of a pipe inspection video processing system. By way of illustration and not limitation, supported embodiments include a video processing for processing an inspection video for a pipe, the system comprising: a cloud server for receiving a pipe inspection video having memory for storing computer readable instructions, and a processor for executing the computer readable instructions, the computer readable instructions including instructions for: receiving a pipe inspection video for storage in a video storage container; extracting a plurality of frames from the pipe inspection video; forming a plurality of receiver containers to perform artificial intelligence operations the plurality of frames in parallel; sending the plurality of frames to the plurality of receiver containers to obtain metrics relating to the pipe inspection video; returning the plurality of frames to the video storage container; and compiling the plurality of frames into a processed pipe inspection video.

Supported embodiments include the foregoing pipe inspection video processing system, wherein the cloud server provides a platform for displaying the processed pipe inspection video.

Supported embodiments include any of the foregoing pipe inspection video processing systems, wherein the platform displays at least one chart.

Supported embodiments include any of the foregoing pipe inspection video processing systems, wherein the platform displays information relating to a condition within the processed pipe inspection video.

Supported embodiments include any of the foregoing pipe inspection video processing systems, wherein the metrics include a priority score.

Supported embodiments include any of the foregoing pipe inspection video processing systems, wherein the computer readable instructions include instructions for: identifying at least one of roots, damage, and debris within the pipe inspection video.

Supported embodiments include any of the foregoing pipe inspection video processing systems, wherein the computer readable instructions include instructions for: calculating a blockage score for the pipe inspection video.

Supported embodiments include any of the foregoing pipe inspection video processing systems, wherein the computer readable instructions include instructions for: calculating an index selected from the group consisting of a root disruption index, a damage disruption index, and a debris buildup index as one of the metrics for the pipe inspection video.

Supported embodiments include any of the foregoing pipe inspection video processing systems, wherein the metrics include a video quality score.

Supported embodiments include any of the foregoing pipe inspection video processing systems, wherein the computer readable instructions include instructions for: determining a location for each of the plurality of the frames as one of the metrics for the pipe inspection video.

Supported embodiments include any of the foregoing pipe inspection video processing systems, wherein the computer readable instructions include instructions for: determining a location for each root, debris, and detected pipe damage as one of the metrics for the pipe inspection video.

Supported embodiments include any of the foregoing pipe inspection video processing systems, wherein the computer readable instructions include instructions for: determining the duration at which a pipe inspector viewed a location within the pipe as one of the metrics for the pipe inspection video.

Supported embodiments include any of the foregoing pipe inspection video processing systems, wherein the computer readable instructions include instructions for: determining the water level anomalies at each location within the pipe as one of the metrics for the pipe inspection video.

Supported embodiments include any of the foregoing pipe inspection video processing systems, wherein the computer readable instructions include instructions for: determining the water level continuously through the pipe as one of the metrics for the pipe inspection video.

Supported embodiments include any of the foregoing pipe inspection video processing systems, wherein the computer readable instructions include instructions for: performing optical character recognition on the pipe inspection video.

Supported embodiments include any of the foregoing pipe inspection video processing systems, wherein the computer readable instructions include instructions for: inserting at least one of bounding boxes and overlays into the pipe inspection video.

Supported embodiments include any of the foregoing pipe inspection video processing systems, wherein the computer readable instructions include instructions for comparing an inspector analysis of the pipe inspection video to an artificial intelligence model based upon the metrics.

Supported embodiments include any of the foregoing pipe inspection video processing systems, wherein the computer readable instructions include instructions for: activating a decision support platform residing on the cloud server to implement at least one of a prioritization list and a work plan.

Supported embodiments include any of the foregoing pipe inspection video processing systems, wherein the computer readable instructions include instructions for: clustering defects on images on the plurality of frames; and automatically measuring the length of defects.

Supported embodiments include any of the foregoing pipe inspection video processing systems, wherein the computer readable instructions include instructions for: performing edge augmentation of real time video feed to point out areas of interest.

Supported embodiments include any of the foregoing pipe inspection video processing systems, wherein the computer readable instructions include instructions for: activating an audit log residing on the cloud server to record an edit history of the processed pipe inspection video.

Supported embodiments include a computer-implemented method for processing an inspection video for a pipe, the method comprising: receiving a pipe inspection video for storage in a video storage container; extracting a plurality of frames from the pipe inspection video; forming a plurality of receiver containers to perform artificial intelligence operations the plurality of frames in parallel; sending the plurality of frames to the plurality of receiver containers to obtain metrics relating to the pipe inspection video; returning the plurality of frames to the video storage container; and compiling the plurality of frames into a processed pipe inspection video.

Supported embodiments include a device, an apparatus, a computer-readable storage medium, a computer program product and/or means for implementing any of the foregoing systems, methods, or portions thereof.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A pipe inspection video processing system for processing a raw pipe inspection video, the system comprising:
   a cloud server having memory for storing computer readable instructions, and a processor for executing the computer readable instructions, the computer readable instructions including instructions for:
   receiving the raw pipe inspection video for storage in a video storage container;
   extracting a plurality of frames from the raw pipe inspection video;
   forming a plurality of receiver containers to perform artificial intelligence operations on the plurality of frames in parallel;
   sending the plurality of frames to the plurality of receiver containers to obtain metrics relating to the raw pipe inspection video;
   returning the plurality of frames to the video storage container;
   compiling the plurality of frames into a processed pipe inspection video;
   automatically identifying roots, damage, and debris within the processed pipe inspection video when at least one of images of roots, damage, and debris are present in the processed pipe inspection video;
   calculating a plurality of scores with each of the plurality of scores being based upon the presence of each image of a root, an indication of damage, and an indication of debris within a pipe when at least one image of a root, a damage indicator, and a debris indicator are present in the processed pipe inspection video; and
   activating a decision support platform residing on the cloud server when at least one image of a root, a damage indicator, and a debris indicator are present in the processed pipe inspection video, so that the decision support platform create at least one of a prioritization list and a work plan;
   wherein the decision support platform sorts the scores when multiple scores are calculated to create the at least one of a prioritization list and a work plan.

2. The pipe inspection video processing system of claim 1, wherein the cloud server provides a platform for displaying the processed pipe inspection video.

3. The pipe inspection video processing system of claim 2, wherein the platform displays at least one chart.

4. The pipe inspection video processing system of claim 3, wherein the platform displays information relating to a condition within the processed pipe inspection video.

5. The pipe inspection video processing system of claim 1, wherein the metrics include a priority score based upon the plurality of scores.

6. The pipe inspection video processing system of claim 1, wherein the computer readable instructions include instructions for:
   calculating a blockage score for the aw pipe inspection video.

7. The pipe inspection video processing system of claim 6, wherein the computer readable instructions include instructions for:
   calculating an index selected from the group consisting of a root disruption index, a damage disruption index, and a debris buildup index as one of the metrics for the raw pipe inspection video.

8. The pipe inspection video processing system of claim 1, wherein the metrics include a video quality score.

9. The pipe inspection video processing system of claim 1, wherein the computer readable instructions include instructions for:
determining a location for each of the plurality of the frames as one of the metrics for the raw pipe inspection video.

10. The pipe inspection video processing system of claim 1, wherein the computer readable instructions include instructions for:
determining a location for each root, debris, and detected pipe damage as one of the metrics for the raw pipe inspection video.

11. The pipe inspection video processing system of claim 1, wherein the computer readable instructions include instructions for:
determining the duration at which a pipe inspector viewed a location within the pipe as one of the metrics for the pipe inspection video.

12. The pipe inspection video processing system of claim 1, wherein the computer readable instructions include instructions for:
determining the water level anomalies at each location within a pipe as one of the metrics for the raw pipe inspection video.

13. The pipe inspection video processing system of claim 1, wherein the computer readable instructions include instructions for:
determining the water level continuously through a pipe as one of the metrics for the raw pipe inspection video.

14. The pipe inspection video processing system of claim 1, wherein the computer readable instructions include instructions for:
performing optical character recognition on the processed pipe inspection video; and
inserting at least one of bounding boxes and overlays into the processed pipe inspection video.

15. The pipe inspection video processing system of claim 1, wherein the computer readable instructions include instructions for:
comparing an inspector analysis of the processed pipe inspection video to an artificial intelligence model based upon the metrics.

16. The pipe inspection video processing system of claim 1, wherein the computer readable instructions include instructions for:
clustering defects on images on the plurality of frames; and
automatically measuring the length of defects.

17. The pipe inspection video processing system of claim 1, wherein the computer readable instructions include instructions for:
performing edge augmentation of real time video feed to point out areas of interest.

18. The pipe inspection video processing system of claim 1, wherein the computer readable instructions include instructions for:
activating an audit log residing on the cloud server to record an edit history of the processed pipe inspection video.

* * * * *